United States Patent [19]

Barber et al.

[11] 4,224,299
[45] Sep. 23, 1980

[54] COMBINATION CHEMICAL PLANT AND BRAYTON-CYCLE POWER PLANT

[75] Inventors: Everett M. Barber, Wappingers Falls; James R. Muenger, Beacon; David L. Alexander, Fishkill, all of N.Y.

[73] Assignee: Texaco Inc., White Plains, N.Y.

[21] Appl. No.: 956,958

[22] Filed: Nov. 2, 1978

Related U.S. Application Data

[63] Continuation of Ser. No. 765,475, Feb. 4, 1977, abandoned.

[51] Int. Cl.$^2$ .................................................. C01C 1/04
[52] U.S. Cl. .................................... 423/360; 423/359
[58] Field of Search .................................... 423/359–363; 60/651, 671, 682; 260/449 R, 449 M, 449.5

[56] References Cited

U.S. PATENT DOCUMENTS

| | | | |
|---|---|---|---|
| 3,484,197 | 12/1969 | Finneran et al. | 423/360 |
| 3,705,009 | 12/1972 | Dougherty | 423/361 |
| 4,045,960 | 9/1977 | Cornelius et al. | 60/651 |

Primary Examiner—Wayne A. Langel
Attorney, Agent, or Firm—Carl G. Ries; Robert A. Kulason; Robert Knox, Jr.

[57] ABSTRACT

A chemical plant, wherein gaseous reactants are converted in an exothermic chemical reaction to a reaction product, is combined with a semi-closed Brayton-cycle power plant to utilize the heat of reaction to generate power. Specifically, in one embodiment, an ammonia synthesis plant, wherein gaseous nitrogen and hydrogen are catalytically converted to ammonia, is combined with a semi-closed Brayton-cycle power plant to utilize the heat of reaction of the ammonia synthesis reaction to generate power.

3 Claims, 4 Drawing Figures

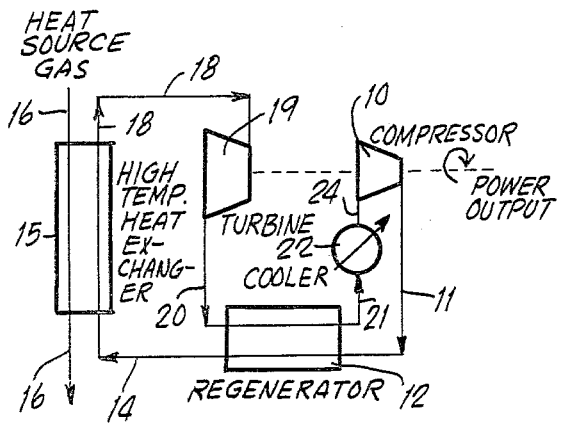
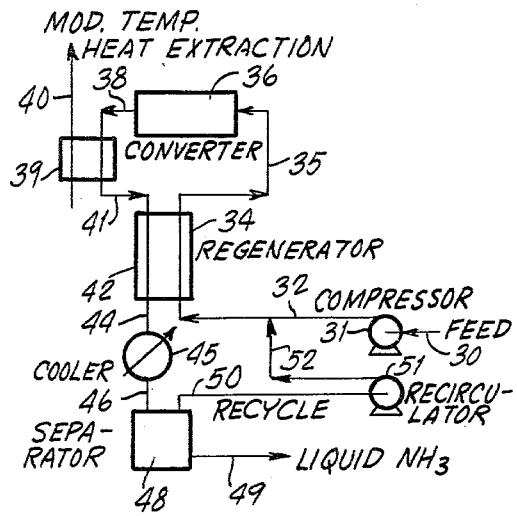
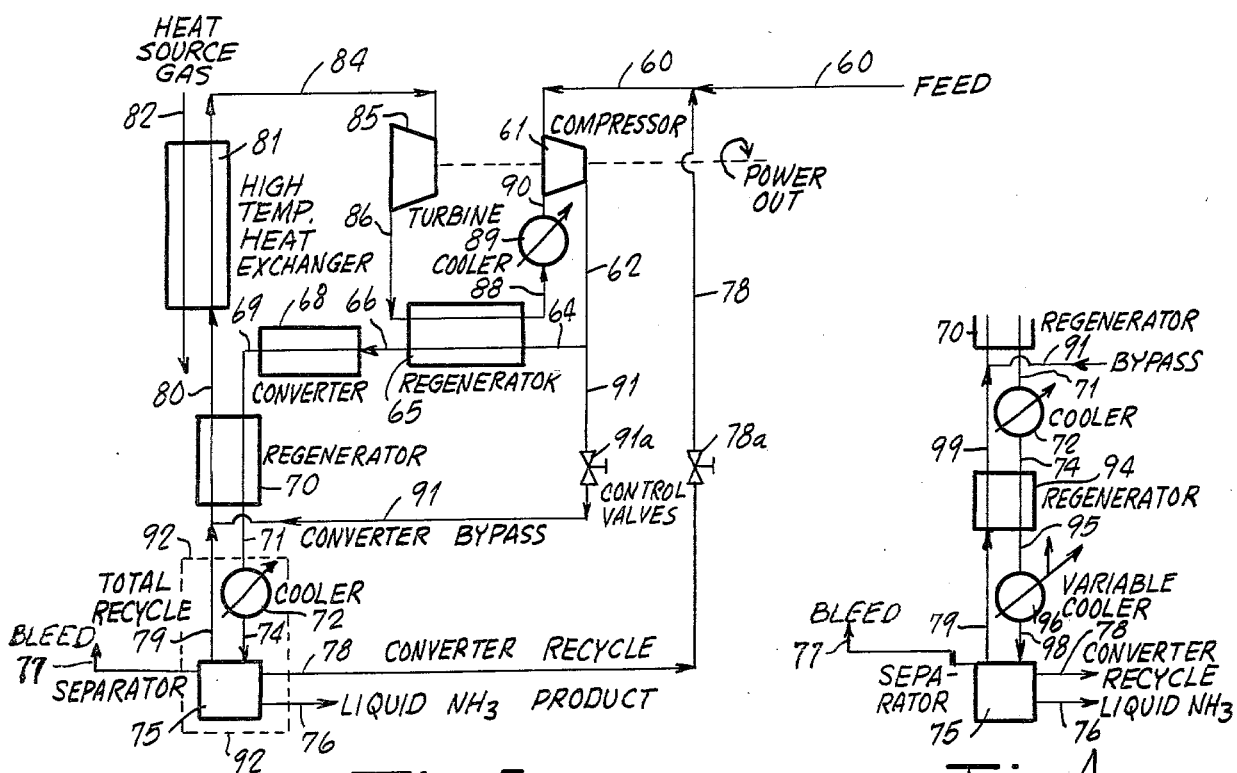

COMBINATION CHEMICAL PLANT AND BRAYTON-CYCLE POWER PLANT

This is a continuation of application Ser. No. 765,475, filed Feb. 4, 1977, now abandoned.

This invention relates to an improved chemical plant, such as a chemical plant wherein gaseous reactants undergo an exothermic chemical reaction to produce a reaction product which is separable or recoverable from the unconverted gaseous reactants. In a specific embodiment, this invention relates to an ammonia synthesis plant wherein heat released by the reaction of hydrogen and nitrogen to form ammonia is employed to produce a portion of the power requirements of the ammonia synthesis plant or to generate electric power.

In the production of power, such as power to drive a gas compressor or to generate electric power, wherein a source of heat at a relatively high temperature is available, a power plant based on the Brayton-cycle is applicable. In a Brayton-cycle power plant, a gaseous working fluid, e.g. helium, argon, nitrogen, air or the like, is compressed, heated to a relatively high temperature, for example, by direct combustion of fuel or by indirect heat exchange with hot gases from a suitable high temperature heat source and the resulting hot gaseous working fluid, usually at a substantially elevated pressure, is supplied to operate a gas turbine to generate power or to operate a compressor. In a closed-cycle or semi-closed cycle plant, all or part of the exhaust gases from the gas turbine pass through a cooler and are then recompressed and reheated for recycle to the gas turbine. Usually, a recuperator or regenerator is provided wherein the compressed gaseous working fluid is passed in heat exchange relationship with exhaust gases from the gas turbine and then is again heated to a high temperature before being passed to the gas turbine for power generation.

In many chemical plants and processes a gaseous mixture is compressed and catalytically reacted to form a desired reaction product. The chemical reaction is often carried out at a relatively high temperature and pressure in the presence of a suitable catalyst and the resulting reaction mixture containing the desired reaction product often contains unconverted or unreacted gaseous reactants which are usefully recycled after separation of the desired reaction product. For example, in an ammonia synthesis plant and process a gaseous mixture of nitrogen and hydrogen is compressed, heated and then introduced into a catalytic converter for conversion into gaseous ammonia. The hot ammonia-containing gaseous reaction effluent or mixture from the catalytic converter is then cooled and liquid ammonia separated therefrom. The unconverted gaseous nitrogen and hydrogen may be recycled in part to the converter with fresh feed nitrogen and hydrogen. In the thus-described ammonia synthesis plant, the catalytic converter, because of the heat of reaction of nitrogen and hydrogen to yield ammonia, produces a hot gaseous effluent capable of being employed as a heat source for the production of power therefrom.

It is an object of this invention to provide an improved chemical plant and process, such as an improved ammonia synthesis plant and process.

It is a specific object of this invention to provide an ammonia synthesis process wherein the hot gaseous effluent from the catalytic converter comprising gaseous ammonia, nitrogen and hydrogen is employed to produce power for use in an ammonia synthesis plant, such as power to drive the compressor for compressing a gaseous admixture of nitrogen and hydrogen to be supplied to the catalytic converter.

How these and other objects of this invention are achieved will become apparent in the light of the accompanying disclosure and drawings wherein:

FIG. 1 schematically illustrates a Brayton-cycle power plant;

FIG. 2 schematically illustrates an ammonia synthesis plant wherein a gaseous admixture of nitrogen and hydrogen is catalytically converted to ammonia and the ammonia recovered as liquid ammonia;

FIG. 3 schematically illustrates an ammonia synthesis plant in accordance with this invention; and FIG. 4 schematically illustrates a cooling or ammonia liquefaction section in accordance with one embodiment of this invention wherein liquid ammonia is recovered from hot gaseous ammonia converter effluent.

In accordance with this invention a chemical plant process is integrated into or combined with a Brayton-cycle power plant. In this combination of operations a substantial amount of power requirements for the chemical plant is furnished by the Brayton-cycle power plant. The heat source for the Brayton-cycle power plant is supplied by the heat of reaction of the chemical process. More specifically, in accordance with this invention a chemical plant employing gaseous reactants which undergo a substantially high temperature catalytic exothermic reaction to produce a desired chemical product is integrated into or combined with a Brayton-cycle power plant. In this combination of operations a substantial amount of the power requirements for the chemical plant, such as power requirements to compress the gaseous reactants to be supplied to the catalytic converter or reactor, is furnished by the Brayton-cycle power plant. The heat source for the Brayton-cycle power plant is supplied by the heat of reaction of the reactants, i.e. the hot gases issuing from the catalytic reactor.

Still more specifically, in accordance with a special, preferred embodiment of this invention, an ammonia synthesis plant is integrated into or combined with a Brayton-cycle power plant. In this combination a substantial amount of the power requirements for the ammonia synthesis plant, such as the power requirements to compress the gaseous nitrogen and hydrogen to be supplied to the ammonia catalytic converter is furnished by the Brayton-cycle power plant. The heat source for the Brayton-cycle power plant is supplied by the heat of reaction of the ammonia conversion operation, i.e. the hot gases issuing from the ammonia catalytic converter.

For a better understanding of the subject invention reference is now made to FIG. 1 of the drawings, which schematically illustrates the Brayton power cycle of a closed-cycle Brayton-cycle power plant. As illustrated in FIG. 1, pressurized working fluid, such as helium, is supplied from compressor 10 via line 11 to heat exchanger or regenerator 12 where the gases are heated. The resulting heated gases are passed via line 14 to high temperature heat exchanger 15 wherein they are passed in indirect heat exchange contact with high temperature gases supplied from a separate heat source, not illustrated, via line 16. The resulting hot recycled gases leave high temperature heat exchanger 15 via line 18 and are supplied to gas turbine 19 which is linked to drive compressor 10. After passing through gas turbine 19 the fairly hot recycled gases are supplied via line 20 to heat exchanger or regenerator 12 to heat the compressed, recycled gases from compressor 10 supplied to heat exchanger or regenerator 12 via line 11. The resulting recycled gases from gas turbine 19 supplied to regenerator or heat exchanger 12 via line 20 leave regenerator or heat exchanger 12 via line 21 and are cooled by cooler 22 and supplied via line 24 to compressor 10. It is seen that the gases flowing through turbine 19 and regenerator or heat exchanger 12 and compressed within compressor 10 and heated within high temperature heat exchanger 15 serve to supply not only the power to compress the recycled gases within compressor 10 but also additional power, as illustrated. Thus, the heat from the high temperature source supplied to high temperature exchanger 15 via line 16 is effectively used to produce mechanical power.

In FIG. 2 there is schematically illustrated an ammonia synthesis plant wherein a gaseous mixture of nitrogen and hydrogen, such as a stoichiometric mixture of nitrogen and hydrogen, is reacted in accordance with the chemical equation,

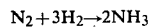

$$N_2 + 3H_2 \rightarrow 2NH_3$$

to produce ammonia. As illustrated in FIG. 2, a gaseous mixture of nitrogen and hydrogen as feed is supplied via line 30 to compressor 31 and the resulting compressed mixture of nitrogen and hydrogen supplied via line 32 to regenerator or heat exchanger 34 wherein it is heated to the desired elevated reaction temperature. The heated gaseous mixture of nitrogen and hydrogen is then supplied via line 35 to catalytic converter 36 wherein the gaseous nitrogen and hydrogen react in part to produce ammonia. The resulting hot gaseous effluent containing ammonia and unreacted nitrogen and hydrogen leave converter 36 via line 38 and are cooled within exchanger 39 by indirect heat exchange contact with a suitable fluid or gas passing therethrough via line 40. The resulting gaseous converter effluent containing ammonia and unconverted hydrogen and nitrogen leaves exchanger 39 via line 41 and passes through heat exchanger or regenerator 42 wherein it is passed in indirect heat exchange relationship with the compressed gaseous nitrogen and hydrogen feed supplied to regenerator or heat exchanger 34 from compressor 31 via line 32. The resulting cooled gaseous effluent leaves heat exchanger or regenerator 42 via line 44 and is further cooled within cooler 45 and the resulting effluent supplied via line 46 to liquid-gas separator 48 wherein the resulting cooled liquid ammonia is separated as product via line 49. The unconverted cooled gaseous nitrogen and hydrogen are removed from separator 48 via line 50 and are passed to recirculator 51 and line 52 for admixture with the compressed gaseous nitrogen and hydrogen feed in line 32. In the operation schematically illustrated in FIG. 2 sufficient fresh gaseous nitrogen and hydrogen feed would be supplied chemically equivalent to the amount of liquid ammonia removed from the system via line 49.

Reference is now made to FIG. 3, which illustrates a presently preferred embodiment of the practices of this invention. FIG. 3 schematically illustrates an ammonia synthesis plant in combination with or integrated with a semi-closed Brayton-cycle power plant in accordance with this invention. In the ammonia synthesis plant in accordance with this invention illustrated in FIG. 3 the unconverted gaseous nitrogen and hydrogen from the ammonia converter are employed as a portion of the working fluid for the power-producing section of the Brayton-cycle. More specifically, gaseous nitrogen and hydrogen as feed for the ammonia synthesis plant are supplied via line 60 from a suitable source, not shown, to compressor 61. The resulting compressed nitrogen and hydrogen gases are supplied from compressor 61 via lines 62 and 64 to heat exchanger or regenerator 65 wherein they are heated by indirect heat exchange and issue via line 66 to catalytic converter 68 wherein the hot gaseous mixture of nitrogen and hydrogen is converted to a hot gaseous effluent comprising ammonia and unreacted nitrogen and hydrogen which leaves converter 68 via line 69. The hot gaseous converter effluent in line 69 is supplied to heat exchanger or regenerator 70 wherein it is partially cooled and then supplied from heat exchanger or regenerator 70 via line 71 to cooler 72 wherein the gaseous effluent comprising ammonia, nitrogen and hydrogen is cooled to a temperature below the dew point of the ammonia therein. The resulting cooled effluent, now containing liquid ammonia, leaves cooler 72 via line 74 and is supplied to separator 75 wherein the liquefied ammonia is separated and removed via line 76 as product. A minor part of the cooled gaseous unconverted nitrogen and hydrogen in a desired and controlled amount may be removed from separator 75 via line 78 through control valve 78a and supplied for admixture with fresh feed gaseous nitrogen and hydrogen in line 60 to compressor 61. Separator 75 provides an advantageous location for getting rid of or bleeding off, intermittently or continuously, via bleed line 77 the extraneous non-reactive gases, such as argon, which may enter the process with the feed gases or from other sources.

All or a major part of the unconverted gaseous nitrogen and hydrogen is supplied from separator 75 via line 79 to heat exchanger or regenerator 70 wherein it is heated by indirect heat exchange with the catalytic converter effluent supplied to heat exchange or regenerator 70 via line 69. The resulting heated unconverted gaseous nitrogen and hydrogen leave regenerator 70 via line 80 and are further heated to a higher temperature in high temperature heat exchanger 81 by indirect heat exchange with a high temperature heat source, such as a high temperature gaseous stream supplied to heat exchanger 81 via line 82. The resulting heated unconverted gaseous nitrogen and hydrogen from heat exchanger 81 are then supplied via line 84 to gas turbine 85 which is linked to or drives compressor 61. The extraction of power from turbine 85, such as to drive compressor 61, results in reduction in temperature of the gases exhausted via line 86 as compared to the temperature of the gases in line 84 supplied to turbine 85.

The recycled unconverted nitrogen and hydrogen gases leave turbine 85 via line 86 and enter heat exchanger or regenerator 65 to supply heat to the compressed gaseous nitrogen and hydrogen feed for ammonia converter 68. The resulting cooled recycled unconverted nitrogen and hydrogen gases leave regenerator 65 via line 88 and are cooled in cooler 89 and then supplied via line 90 to compressor 61 driven by gas turbine 85 wherein the unconverted nitrogen and hydrogen gases are compressed and passed from compressor 61 via line 62 and line 64 to regenerator 65 and then catalytic converter 68. A desired or controlled portion of the compressed nitrogen and hydrogen gases from compressor 61 and line 62 may be supplied via line 91 through control valve 91a to line 79 for further heating in regenerator 70 and high temperature heat exchanger 71 and then the gas turbine 85 to drive the same.

In the continuous operation of the combined Brayton-cycle ammonia synthesis plant illustrated in FIG. 3, sufficient nitrogen and hydrogen gases as feed would be supplied via line 60 chemically equivalent to the amount of liquid ammonia withdrawn as product from separator 75 via line 76. Unconverted nitrogen and hydrogen gases from separator 75 are passed directly to gas turbine 85 via lines 79, 80 and 84 for recycle to converter 68. As illustrated, a portion of unconverted gaseous nitrogen and hydrogen from separator 75 may be recycled through ammonia converter 68 via line 78, valve 78a, line 60, compressor 61 and lines 62, 64 and 66. Also, a portion of the unconverted gaseous nitrogen and hydrogen from separator 75 can be recycled through compressor 61, lines 62 and 91 and valve 91a to turbine 85 via lines 80 and 84.

In FIG. 4 there is schematically illustrated an alternate cooling scheme for the controlled recovery of liquid ammonia product and unconverted gaseous nitrogen and hydrogen carried out in that section of the combination ammonia Brayton-cycle power plant of this invention within the dashed lines 92 of FIG. 3. As illustrated in FIG. 4 hot catalytic converter effluent gases comprising ammonia, nitrogen and hydrogen leave heat exchanger or regenerator 70 via line 71 and are cooled in cooler 72 and then move via line 74 through heat exchanger or regenerator 94 and line 95 to variable, controlled cooler 96. The resulting cooled effluent comprising an admixture of liquid ammonia and cooled unconverted gaseous nitrogen and hydrogen leave cooler 96 via line 98 and enter separator 75 from which liquid ammonia product is recovered via line 76. Like separator 75, as illustrated in FIG. 3, separator 75 of FIG. 4 is provided with bleed line 77 to vent unreactive gases, such as argon, to prevent their build-up in the system. The cooled unconverted gaseous nitrogen and hydrogen for converter recycle are removed from separator 75 via line 78. The gaseous unconverted nitrogen and hydrogen recovered from separator 75 via line 79 are heated by indirect heat exchange contact in heat exchanger or regenerator 94 and issue therefrom via line 99 and are again heated in heat exchanger or regenerator 70 before being passed in controlled admixture with converter bypass nitrogen and hydrogen supplied via line 91 to high temperature heater or heat exchanger 81, see FIG. 3, for supply to gas turbine 85 for power generation.

In the ammonia synthesis plant in accordance with the embodiment of this invention illustrated in FIG. 3 there is employed a high temperature heat source, such as a high temperature gas, to heat the recycled unconverted nitrogen and hydrogen gases before these gases are supplied to turbine 85 to drive the same and to drive the associated compressor 61 and supply additional power, as indicated, such as to drive an electrical generator, not shown. The practice of this embodiment of the invention is particularly applicable to an ammonia synthesis plant wherein the ammonia synthesis gas, particularly the gaseous hydrogen component thereof, is derived from the partial oxidation of a hydrocarbonaceous and/or carbonaceous fuel, such as a heavy fuel oil or other gaseous and/or liquid petroleum fraction or even finely divided carbon, by reacting the fuel with a controlled amount of oxygen, such as substantially pure oxygen. In this operation, such as in the well known Texaco Synthesis Gas Generation Process, hereinafter referred to as TSGGP, there is produced a very hot gaseous effluent containing carbon monoxide which is then reacted with steam to produce gaseous hydrogen and, after purification, is admixed with gaseous nitrogen to form ammonia synthesis feed gas. An air separation plant would supply oxygen for the TSGGP and substantially pure nitrogen for the ammonia synthesis feed gas.

The hot carbon monoxide-containing effluent produced in the TSGGP by the partial oxidation of a hydrocarbonaceous and/or carbonaceous fuel, such as a heavy fuel oil or a lighter petroleum fraction or a gaseous hydrocarbon or even a fuel comprised substantially only of carbon, would, as indicated, by an ideal high temperature gas source for use in the practices of this invention to heat the recycled unconverted gaseous nitrogen and hydrogen to drive the gas turbine to supply the compressor and other power requirements of the ammonia synthesis unit.

The air separation plant for nitrogen production and oxygen production for use in TSGGP could yield these gases at a desired high pressure and the TSGGP could be operated at a desired coordinated high pressure to efficiently produce high pressure hydrogen as well as a high temperature heat (gas) source to heat the unconverted recycled nitrogen and hydrogen to a desired high temperature and pressure to drive the gas turbine and compressor for supplying feed nitrogen and hydrogen to the high pressure ammonia catalytic converter.

The integrated or combined semi-closed Brayton-cycle power plant and ammonia synthesis plant in accordance with this invention, as indicated hereinabove, permits utilization of the heat of reaction of ammonia synthesis to be used via the Brayton power cycle to furnish at least part of the power requirements of the ammonia synthesis operation or plant. For example, a substantial amount, about 13%, of the ammonia synthesis power requirements can be obtained by heat transfer of only about 40% of the ammonia synthesis heat of reaction to the Brayton cycle power plant recycle gases. By proper adjustment of the flow rates of the regenerators 65 and 70, see FIG. 3, these regenerators can be balanced and a condition approaching 100% transfer of heat of reaction from converter 68 to the Brayton-cycle recycle gases could be achieved. Under such circumstance as much as about 35% of the overall power requirements of the ammonia synthesis plant could be realized from the ammonia synthesis reactor. An additional advantage would be apparent from comparison of FIG. 3 and FIG. 2, the practice of this invention would eliminate the conventionally employed compressor, recirculator and heat extractor, see exchanger 39 of FIG. 2, of a conventional ammonia synthesis plant.

A rough heat-power balance of the overall process or arrangement in accordance with this invention as illustrated in FIG. 3 further indicates the advantages obtainable. In this heat-power balance the converter bypass and the converter recycle loops are assumed absent and pressure losses are not considered although it is realized that such pressure losses would influence compression ratios and would require a partial oxidation pressure, e.g. TSGGP as the high temperature heat source for the supply of the high temperature gases supplied to heat exchanger 81, somewhat above the lowest Brayton-cycle pressure. Power requirements for ammonia synthesis-partial oxidation-air separation plants typically run between 900 and 1000 hp hr/T $NH_3$. In an ammonia synthesis plant the gaseous ammonia synthesis converter exit temperature may be reasonably taken to be about 900° F. and about 10% pass conversion of nitrogen and hydrogen to ammonia may be expected. Likewise, a turbine operated at a temperature of 1300° F. and an ammonia synthesis converter operated at a pressure of 3000 psi are reasonable values. Minimum stream-to-stream temperature differences in the regenerators is taken as about 30° F. and compression and expansion efficiencies of about 86% on adiabatic basis are assumed.

A temperature rise of approximately 145° F. would be experienced for the process stream during passage through the ammonia converter, the process stream of gaseous nitrogen and hydrogen entering the ammonia synthesis converter at a temperature of about 755° F. The gas turbine exhaust would be used to secure this temperature by heat exchange in regenerator 65, see FIG. 3. Assuming a temperature of 325° F. for the process stream entering the cold end of regenerator 65 and assuming 10% difference in thermal capacity of the current flowing streams to correspond to the mass unbalance, a turbine exhaust temperature of about 835° F. would be expected. It can be calculated that the effective transfer of the heat of reaction from converter 68 to the recycled gases in the power cycle would be about 40% and that about 13% of the required heat input for power development would come from this source. The process power requirement corresponds to an equivalent cycle thermal efficiency of about 32–36% which is reasonably large for Brayton power cycles. The expansion ratio is calculated to be about 3.55 which indicates that the partial oxidation system should operate somewhat above 845 psi, it being assumed that the feed gas is produced by a partial oxidation system, e.g. TSGGP.

It should be noted that two of the power requirements normally associated with the 900-1000 hp hr/T NH$_3$ requirement range are satisfied by the compressor of the power cycle.

The liquid NH$_3$ product of the integrated or combined Brayton power cycle and ammonia synthesis plant of this invention must equal the feed gaseous nitrogen and hydrogen for continuous operation. The amount of feed is set by the synthesis gas production. There is an approximate balance of ammonia production, power requirements, circulation and feed, however, adjustment can be made by controlling the flow of the converter bypass and/or converter recycle loops while maintaining the required flow through the turbine. Further, adjustment and control in the overall system balance can be obtained by varying the completeness of the ammonia condensation and separation as indicated in the alternate cooling scheme illustrated in FIG. 4.

If 90% of the flow leaving the compressor, see compressor 61 of FIG. 3, is sent through the converter, the flow in each regenerator would be in balance assuming that liquid ammonia production is maintained at about 10% the compressor flow. In this situation the recovery of the heat of reaction for power production would be more efficient.

Because of the large flow rates necessary for efficient utilization of rotary compressors, particularly axial flow compressors, the subject invention, i.e. the integration of a Brayton-cycle power plant in an ammonia synthesis plant, would be particularly applicable for large scale ammonia synthesis plants.

The production of ammonia by high pressure, relatively high temperature catalytic conversion of gaseous nitrogen and hydrogen is a well known, commercially important chemical operation. The catalytic conversion of gaseous nitrogen and hydrogen to ammonia is conveniently carried out at a temperature in the range 700°–1000° F. and a pressure in the range 60–450 atmospheres. For process conditions and catalysts useful in the catalytic conversion of gaseous nitrogen and hydrogen to ammonia reference is made to U.S. Pat. No. 3,839,229, the disclosures of which are herein incorporated and made part of this disclosure.

In the practices of this invention a high temperature heat source is employed to heat the unconverted gaseous reactants, nitrogen and hydrogen, after leaving the heat exchanger or regenerator downstream of the catalytic converter wherein the unconverted gaseous reactants, nitrogen and hydrogen, recovered from separator 75, see FIG. 3, are passed in indirect heat exchange contact with the hot gaseous converter effluent. Any suitable high temperature heat source is usefully employed for heating the unconverted reactants or gases for operating the gas turbine. It is particularly preferred in the practices of this invention to employ as the high temperature source the hot gaseous effluent resulting from the partial oxidation of a carbonaceous or hydrocarbonaceous fuel, such as a hydrocarbon gas or fuel oil, as is produced in the TSGGP wherein carbonaceous or hydrocarbonaceous fuel is partially oxidized with substantially pure oxygen. The high temperature, high pressure gases resulting from this operation, i.e. TSGGP, are, as indicated, usefully employed to heat the unconverted gaseous nitrogen and hydrogen being supplied to the gas turbine. These high temperature, high pressure gases from TSGGP are subsequently suitably treated to produce a high pressure hydrogen gas stream.

This operation, i.e. TSGGP, for production of feed hydrogen for the ammonia synthesis plant, is usefully, and preferably, combined in the practices of this invention with an air separation plant for the separation of oxygen and nitrogen. The resulting separated oxygen would supply the oxygen for effecting partial oxidation of the carbonaceous or hydrocarbonaceous fuel in the TSGGP and the separated nitrogen would be usefully employed in admixture with the gaseous hydrogen stream generated in the TSGGP operation for feed to the ammonia synthesis plant. The aforesaid operation, i.e. TSGGP, as indicated, is usefully carried out at a high pressure to supply a high pressure hydrogen source for supplying the hydrogen component of the ammonia synthesis feed gas.

It is thus seen that the combination of operations involving TSGGP for supplying a hydrogen feed stream and an air separation plant for supplying oxygen for the operation of the TSGGP and for the supply of gaseous nitrogen together with hydrogen from TSGGP as feed for the ammonia synthesis plant provides a useful combination of operations in the practices of this invention. Additionally, in this combination of operations heat recovered from the TSGGP is employed to heat the unconverted gaseous nitrogen and hydrogen to drive the gas turbine which is advantageously linked to a compressor to compress the gaseous nitrogen and hydrogen feed to the converter, with the turbine also supplying additional power for overall plant operation.

Although emphasis has been placed in the accompanying disclosure as to the applicability of the practices of this invention to a combined Brayton-cycle power plant and ammonia synthesis plant, as is apparent from the foregoing disclosure, the practices of this invention are also applicable to other reactions wherein gaseous reactants undergo exothermic reaction to yield a reaction mixture containing a reaction product which is separable from the unconverted gaseous reactants or unreactive diluent gases which may be passed along with the gaseous reactants. The exothermic chemical reaction involving the gaseous reactants may be catalytic or non-catalytic and, if catalytic, the catalyst may be employed as a fixed mass, a fluidized mass or a moving bed of catalyst. Reactions which involve an exothermic chemical reaction with gaseous reactants and which are suitably combined in combination with a Brayton-cycle in accordance with the practices of this invention include the catalytic reaction of gaseous hydrogen and gaseous carbon monoxide to yield methanol, methanol being the reaction product which can be readily separated and recovered from the gaseous reaction mixture comprising hydrogen, carbon monoxide and methanol. Another exothermic chemical reaction, also involving gaseous hydrogen and carbon monoxide, which is adaptable or suitable for use in the practices of this invention is the so-called Fischer-Tropsch reaction wherein hydrogen and carbon monoxide are catalytically chemically reacted to produce a mixture of hydrocarbons and/or oxygenated hydrocarbons which are also readily separable from the unconverted hydrogen and carbon monoxide. The unconverted hydrogen and carbon monoxide in the above-mentioned reactions can be recycled in accordance with this invention in combination with the Brayton-cycle power plant in the manner disclosed hereinabove with respect to an ammonia synthesis gas unit wherein unconverted gaseous nitrogen and hydrogen is reheated and recycled.

In the disclosures of the practices of this invention with respect to the combination of TSGGP and Brayton-cycle power plant employing an extraneous high temperature heat source, there is disclosed as the high temperature heat source, the high temperature gaseous products resulting from the controlled oxidation of a carbonaceous and/or hydrocarbonaceous fuel which is generated to provide the hydrogen gas to supply the hydrogen component of the feed gas to the ammonia converter. In the practices of this invention with respect to the above-described reactions between hydrogen and carbon monoxide for the production of methanol or hydrocarbons and oxygenated hydrocarbons, as in the Fischer-Tropsch process, if such a high temperature heat source is not available, the high temperature heat source may be provided by other means, such as from the combustion effluent of a power plant associated with the chemical plant, electrical heaters which might be extraneously powered, for example, partially by electrical power which might be generated in the combined chemical plant and Brayton-cycle power plant or by other means, such as a pebble heater wherein solid, particulate inert or non-reactive material is employed as a heat transfer agent to supply heat from one heat source, such as combustion gases from a furnace, to the gases to be heated, such as the unreacted or unconverted gaseous reactants.

In the above-described other embodiments of the practices of this invention the reactor wherein the gaseous reactants are converted to a gaseous reaction mixture from which the reaction product is recovered and the unconverted gaseous reactants separated and recycled, may be operated isothermally, either at a selected high temperature optimum for the reaction taking place or isothermally at a temperature substantially the same as the temperature of the gaseous reactants supplied to the reactor. In these variations or embodiments of the practices of this invention the exothermic heat of reaction would be removed from the reactor so as to maintain a controlled, substantially isothermal, temperature within the reactor by suitable heat exchange means which would be incorporated within the reactor and provided with a suitable heat exchange fluid or gases which would be heated upon passing through the heat exchange means provided within the reactor. If the reactor is operated isothermally at a temperature above the gaseous reactants supplied to the reactor, unconverted recycled gaseous reactants could be used as the heat exchange fluid or gases and after passing through the heat exchange means provided within the reactor, would be heated to a suitable temperature, such as to drive the turbine.

As will be apparent to those skilled in the art in the light of the foregoing disclosure, many modifications, alterations and substitutions are possible in the practice of this invention without departing from the spirit or scope thereof.

We claim:

1. In a process wherein gaseous hydrogen and nitrogen are supplied to and reacted with one another in a reaction zone, wherein they undergo exothermic reaction to produce ammonia at an elevated temperature and pressure, the resulting ammonia is separated and recovered from unconverted gaseous hydrogen and nitrogen at substantially reaction pressure and at reduced temperature in a separation zone and unconverted gaseous hydrogen and nitrogen are recycled to the reaction zone and fresh feed gaseous hydrogen and nitrogen are supplied to said reaction zone, the improvement which comprises passing said gaseous reaction product ammonia admixed with unconverted gaseous reactants directly from said reaction zone at said elevated temperature and pressure into indirect heat exchange with relatively cooler unconverted gaseous reactants from said separation zone in a first heat exchange zone, thereby heating said unconverted gaseous reactants, further heating resulting unconverted gaseous reactants to a temperature higher than said reaction zone temperature by indirect heat exchange with a heating medium in a second heat exchange zone, thereafter expanding resulting heated unconverted reactants in a heat engine with the production of power therefrom, cooling and recompressing said reactants and supplying said recompressed unconverted reactants to said reaction zone.

2. In a process wherein gaseous hydrogen and nitrogen are supplied to and reacted with one another in a reaction zone, wherein they undergo exothermic reaction to produce ammonia at an elevated temperature and pressure, the resulting ammonia is separated and recovered from unconverted gaseous hydrogen and nitrogen at substantially reaction pressure and at reduced temperature in a separation zone and unconverted gaseous hydrogen and nitrogen are recycled to the reaction zone and fresh feed gaseous hydrogen and nitrogen are supplied to said reaction zone, the improvement which comprises passing said gaseous reaction product ammonia admixed with unconverted gaseous reactants directly from said reaction zone at said elevated temperature and pressure into indirect heat exchange with relatively cooler unconverted gaseous reactants from said separation zone in a first heat exchange zone, thereby heating said unconverted gaseous reactants, further heating resulting unconverted gaseous reactants to a temperature higher than said reaction zone temperature by indirect heat exchange with a heating medium in a second heat exchange zone, thereafter expanding resulting heated unconverted reactants in a heat engine with the production of power therefrom, cooling and recompressing said reactants and supplying said recompressed unconverted reactants to said reaction zone, a portion of the unconverted gaseous reactants from the separation step being recycled directly to said reaction zone, thus by-passing the heat exchange zones.

3. In a process wherein gaseous hydrogen and nitrogen are supplied to and reacted with one another in a reaction zone, wherein they undergo exothermic reaction to produce ammonia at an elevated temperature and pressure, the resulting ammonia is separated and recovered from unconverted gaseous hydrogen and nitrogen at substantially reaction pressure and at reduced temperature in a separation zone and unconverted gaseous hydrogen and nitrogen are recycled to the reaction zone and fresh feed gaseous hydrogen and nitrogen are supplied to said reaction zone, the improvement which comprises passing said gaseous reaction product ammonia admixed with unconverted gaseous reactants directly from said reaction zone at said elevated temperature and pressure into indirect heat exchange with relatively cooler unconverted gaseous reactants from said separation zone in a first heat exchange zone, thereby heating said unconverted gaseous reactants, further heating resulting unconverted gaseous reactants to a temperature higher than said reaction zone temperature by indirect heat exchange with a heating medium in a second heat exchange zone, thereafter expanding resulting heated unconverted reactants in a heat engine with the production of power therefrom, cooling and recompressing said reactants and supplying said recompressed unconverted reactants to said reaction zone, a portion of the recompressed unconverted gaseous reactants being passed directly to said first heat exchange zone into indirect heat exchange with gaseous reaction product and unconverted gaseous reactants from the reaction zone in admixture with unconverted gaseous reactants from said separation zone and thus recycled to said heat engine while by-passing said reaction zone.

* * * * *